United States Patent
Evans

(10) Patent No.: US 10,386,703 B1
(45) Date of Patent: Aug. 20, 2019

(54) SYSTEMS AND METHODS FOR ORBITING IMAGING

(71) Applicant: Chandler Evans, Venice, CA (US)

(72) Inventor: Chandler Evans, Venice, CA (US)

( * ) Notice: Subject to any disclaimer, the term of this patent is extended or adjusted under 35 U.S.C. 154(b) by 0 days.

(21) Appl. No.: 15/943,889

(22) Filed: Apr. 3, 2018

(51) Int. Cl.
| | |
|---|---|
| G03B 17/56 | (2006.01) |
| H04N 5/232 | (2006.01) |
| G01S 3/78 | (2006.01) |
| H04N 5/225 | (2006.01) |
| G01S 3/786 | (2006.01) |

(52) U.S. Cl.
CPC .......... *G03B 17/561* (2013.01); *G01S 3/7864* (2013.01); *H04N 5/2252* (2013.01); *H04N 5/23203* (2013.01); *H04N 5/23238* (2013.01)

(58) Field of Classification Search
CPC ............. G03B 17/561; H04N 5/23238; H04N 5/2252; H04N 5/23203; G01S 3/7864
See application file for complete search history.

(56) References Cited

U.S. PATENT DOCUMENTS

| | | | |
|---|---|---|---|
| 3,780,220 A * | 12/1973 | Fugitt | B63C 11/48 348/81 |
| 6,450,706 B1 | 9/2002 | Chapman | |
| 6,476,856 B1 | 11/2002 | Zantos | |
| 8,162,061 B2 * | 4/2012 | Maxwell | E21B 41/0007 166/177.4 |
| 9,641,730 B2 | 5/2017 | Rosenberry et al. | |

(Continued)

FOREIGN PATENT DOCUMENTS

| | | |
|---|---|---|
| CN | 205901882 U | 1/2017 |
| WO | 2016/096161 | 6/2016 |

OTHER PUBLICATIONS

Canon Schweiz "Bullet Time Shot—Making of" You Tube Video available at https://www.youtube.com/watch?v=WDdxMBq2GW8 published Oct. 18, 2013, accessed on Apr. 6, 2018.

(Continued)

*Primary Examiner* — Shahbaz Nazrul
(74) *Attorney, Agent, or Firm* — Fox Rothschild LLP

(57) ABSTRACT

Systems and methods for capturing an orbiting image of a subject are disclosed. The system includes a rotatable turntable mountable to an overhead surface with a spindle formed therein and a retractable line extending therefrom at a proximal end thereof. First and second lines extend from a distal end of retractable line in opposite directions as retractable line is extended from an exterior of rotatable turntable. The system further includes an imaging assembly with a housing and an interior compartment in which housing includes first and second rotors at first and second ends thereof such that first and second lines are connected to first and second rotors. Interior compartment receives a multimedia device attached thereto and is at least partially visible from an exterior of housing. A remote control is configured to control the rotatable turntable to in turn control speed of rotation of imaging assembly, and the length of line extended or retracted from/to spindle, and further configured to control first and second rotors to in turn control angle of multimedia device. Imaging assembly is rotated from above the subject along a rotation path to enable 360 degree orbiting image capture while the subject is in motion or static during operation.

24 Claims, 6 Drawing Sheets

(56) References Cited

U.S. PATENT DOCUMENTS

| | | | |
|---|---|---|---|
| 2010/0318059 A1* | 12/2010 | Farritor | A61B 1/00156 604/500 |
| 2015/0212391 A1* | 7/2015 | Waibel | G03B 15/006 701/2 |
| 2015/0282714 A1 | 10/2015 | Mueller et al. | |
| 2016/0173740 A1* | 6/2016 | Corby | G06K 9/6267 348/144 |
| 2016/0173741 A1* | 6/2016 | Wolfenbarger | G03B 17/08 348/81 |
| 2016/0195798 A1* | 7/2016 | Nenov | F16M 13/04 348/373 |
| 2016/0200437 A1* | 7/2016 | Ryan | B64C 39/022 244/99.2 |
| 2017/0208238 A1 | 7/2017 | Xu | |
| 2018/0282714 A1 | 10/2018 | Mueller et al. | |

OTHER PUBLICATIONS

Conley, S., "Part 2: How to make a 360 degree hands free ceiling mount camera mount! No more tripods!" YouTube Video available at https://www.youtube.com/watch?v=uY1beuAbrRo published Dec. 11, 2016, accessed May 30, 2018.

Legeer, M., "How I Created a Matrix Bullet Time-Style Rig With 50 DSLRs", PetaPixel, Dec. 19, 2012, available at https://petapixel.com/2012/12/19/how-i-created-a-matrix-bullet-time-style-rig-with-50-dslrs/.

Rober, M., "EPIC Matrix effect w/a ceiling fan & 1 GoPro (Ghetto bullet time)" YouTube Video available at https://www.youtube.com/watch?v=OEd5ITmeAH8 published May 9, 2013, accessed on Apr. 6, 2018.

Vuignier, N.. "Centriphone an iPhone video experiment by Nicolas Vuignier" YouTube Vide available at https://www.youtube.com/watch?v=aqncOP7OzMg published on Feb. 5, 2016, accessed on Apr. 6, 2018.

Website for Insta360 360 Camera, available at https://www.insta360.com/ Accessed on May 30, 2018.

Website for Centriphone, available at http://www.centriphone.me/ Accessed on Apr. 6, 2018.

Website for Orcavue, available at https://orcavue.com/ accessed on Apr. 6, 2018.

Lee, D., "Bullet Time and The Matrix" YouTube Video available at https://www.youtube.com/watch?v=bKEcElcTUMk published on Jun. 5, 2012, accessed May 30, 2018.

International Search Report and Written Opinion, issued by the ISA/U.S. Receiving Office, regarding corresponding International patent application Serial No. PCT/US2019/025309, dated May 3, 2019; 7 pages.

* cited by examiner

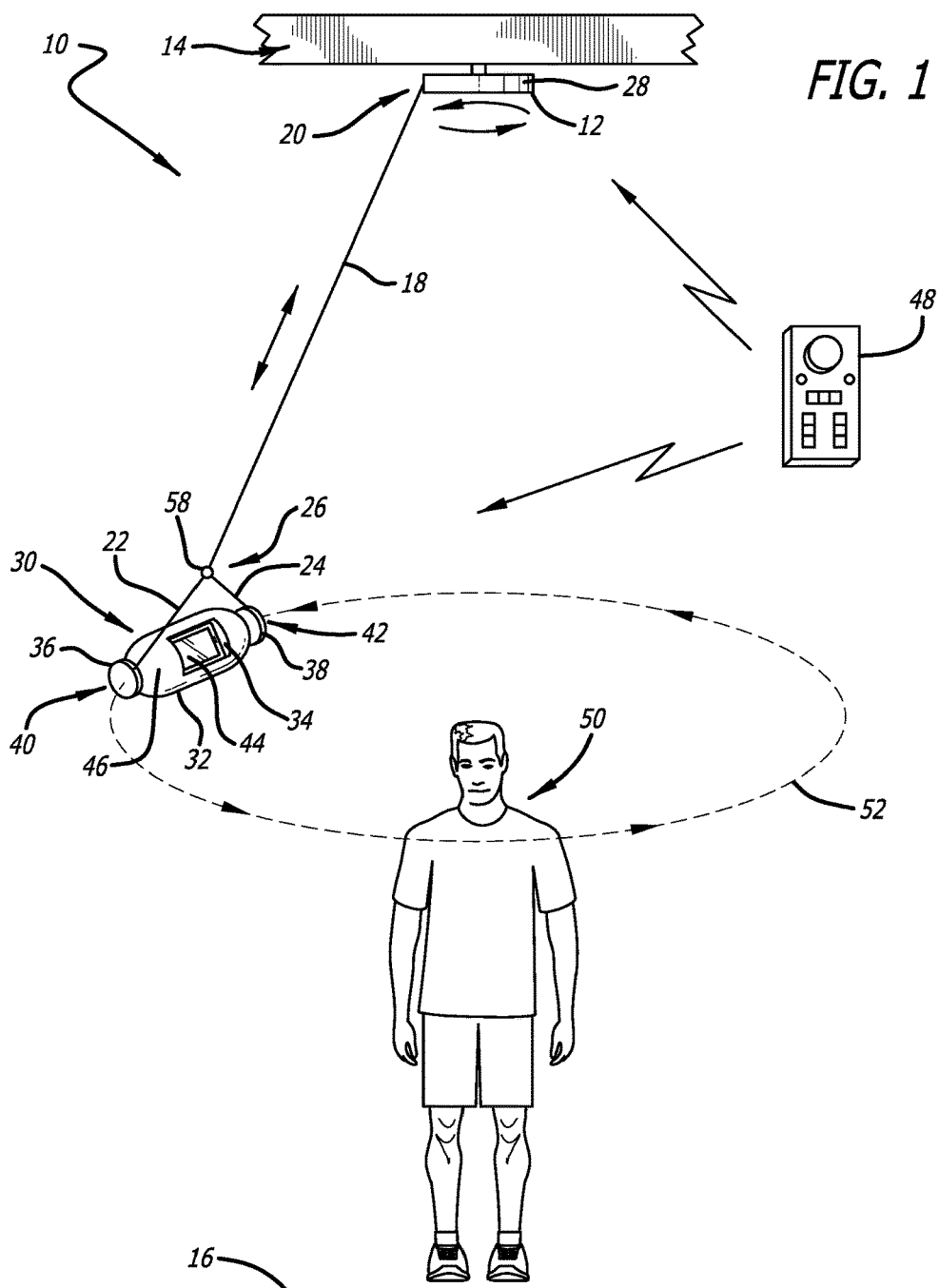
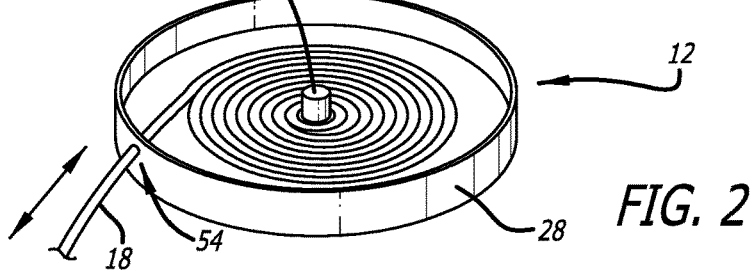

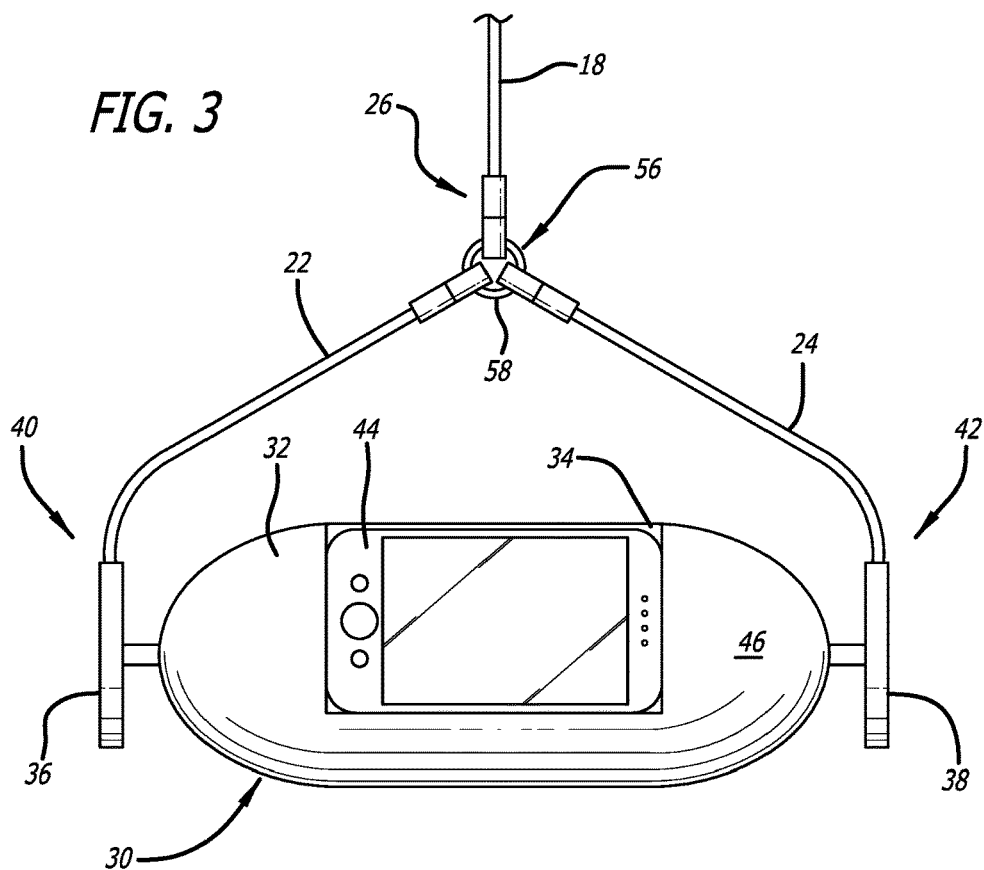
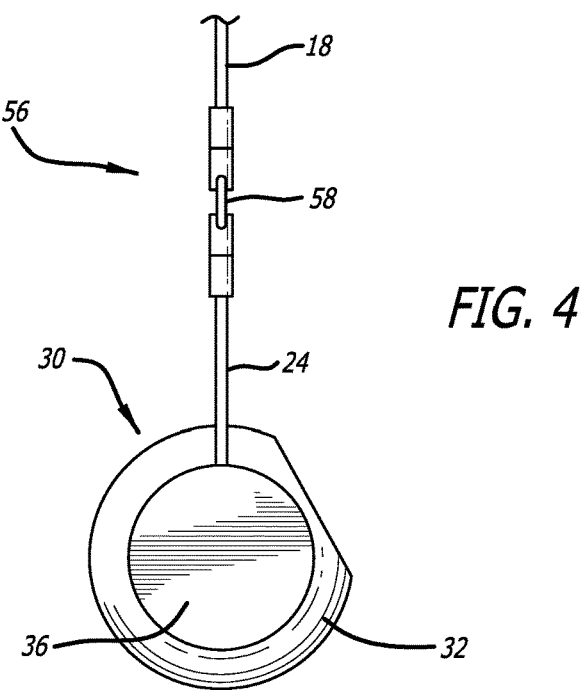

SYSTEMS AND METHODS FOR ORBITING IMAGING

TECHNICAL FIELD

The present disclosure relates to the field of imaging systems, and more particularly, to systems and methods for capturing an orbiting image of a subject in bullet time for filmmaking and other media purposes.

BACKGROUND

"Bullet time" is a type of visual effect widely used in filmmaking, broadcast advertisements, and real time graphics within video games and other special media. The science fiction film franchise series, "The Matrix", is known for popularizing bullet time, which allows a shot to progress in slow motion while the camera appears to move through the scene at normal speed. Bullet time requires a large media budget and is very time consuming to produce. Conventional imaging systems and methods used to create bullet time require a physical studio space with a 360 degree green screen backdrop, an array of multiple cameras, and countless hours of post-production to render and stitch the shots together to achieve a seamless action shot. Further, subjects must stay within the physical confines of the camera array.

It would thus be desirable to have improved imaging systems and methods for capturing an orbiting image of a subject, among other desirable features as described herein, which avoid the disadvantages of conventional imaging systems and methods used in filmmaking and other media to create the "bullet time" effect.

SUMMARY

In a first aspect, there is provided herein a system for capturing an orbiting image of a subject, according to the present disclosure. The system includes a rotatable turntable configured to be mountable to an overhead surface and having a spindle formed therein and a retractable line extending therefrom at a proximal end thereof. First and second lines extend from a distal end of the retractable line in opposite directions as the retractable line is extended from an exterior of the rotatable turntable. The system further includes an imaging assembly with a housing and an interior compartment in which the housing has first and second rotors at first and second ends thereof such that the first and second lines are connected to the first and second rotors. The interior compartment receives a multimedia device that is attached thereto and is at least partially visible from an exterior of the housing. A remote control is configured to control the rotatable turntable to in turn control speed of rotation of the imaging assembly, and the length of the retractable line extended or retracted from/to the spindle, and further configured to control the first and second rotors to in turn control the multimedia device angle. The imaging assembly is rotated from above the subject along a rotation path to enable 360 degree orbiting image capture while the subject is in motion or static during operation.

In certain embodiments, the rotatable turntable is configured to generate rotation of the imaging assembly at variable speeds via the remote control.

In certain embodiments, the retractable line extending therefrom the spindle is adjustable via the remote control such that as more of the retractable line is extended a wider rotation of the imaging assembly is generated.

In certain embodiments, the retractable line is configured to pass through a side opening of the rotatable turntable.

In certain embodiments, the retractable line is configured with at least one safety component at the distal end thereof such that the first and second lines are configured to detach therefrom at a connection point in the event at least one of the retractable line and the first and second lines become tangled during operation.

In certain embodiments, the imaging assembly is configured to be aerodynamic.

In certain embodiments, the multimedia device is a camera.

In certain embodiments, the overhead surface is at least one of a structural beam, ceiling, crane, drone, rope, slackline, staircase, tree limb, and wire cable.

In certain embodiments, the remote control is further configured to align an orientation of the multimedia device in an imaging direction of the subject either inwardly toward inner circle or outwardly away from radius of the rotation path.

In certain embodiments, the remote control is further configured to control at least one operation parameter of the multimedia device.

In certain embodiments, the remote control is further configured to trigger the multimedia device to capture orbiting images of the subject when in motion or static.

In a second aspect, there is provided herein a system for capturing an orbiting image of a subject. The system includes a rotatable turntable configured to be mountable to an overhead surface and having first and second spindles formed therein and first and second retractable lines extending therefrom at a proximal end thereof. The system further includes an imaging assembly with a housing and an interior compartment in which the housing includes first and second rotors at first and second ends thereof such that the first and second retractable lines are connected to the first and second rotors. The interior compartment receives a multimedia device that is attached thereto and is at least partially visible from an exterior of the housing. A remote control is configured to control the rotatable turntable to in turn control speed of rotation of the imaging assembly, and the length of each retractable line extended or retracted from/to each spindle, and further configured to control the first and second rotors to in turn control the multimedia device angle. The imaging assembly is rotated from above the subject along a rotation path to enable 360 degree orbiting image capture while the subject is in motion or static during operation.

In a third aspect, there is provided herein a method for capturing an orbiting image of a subject. The method includes the following steps: mounting a rotatable turntable having a spindle formed therein to an overhead surface; extending a retractable line therefrom the spindle at a proximal end thereof; extending a first line and a second line from a distal end of the retractable line in opposite directions as the retractable line is extended from an exterior of the rotatable turntable; providing a multimedia device; providing an imaging assembly having a housing and an interior compartment, the housing having a first rotor at a first end thereof and a second rotor at a second end thereof; connecting the first line to the first rotor and the second line to the second rotor; receiving the multimedia device therein the interior compartment in which the multimedia device is attached thereto and is at least partially visible from an exterior of the housing; providing a remote control for controlling the rotatable turntable to control speed of rotation of the imaging assembly, and the length of the retractable line extended or retracted from/to the spindle, and for controlling the first and second rotors to control the multimedia device angle; and rotating the imaging assembly from above the subject along a rotation path to enable 360 degree orbiting image capture while the subject is in motion or static during operation.

In certain embodiments, the step of providing a remote control for controlling the rotatable turntable to control speed of rotation of the imaging assembly, and the length of the retractable line extended or retracted from/to the spindle, and for controlling the first and second rotors to control the multimedia device angle further includes configuring the rotatable turntable to generate rotation of the imaging assembly at variable speeds via the remote control.

In certain embodiments, the step of providing a remote control for controlling the rotatable turntable to control speed of rotation of the imaging assembly, and the length of the retractable line extended or retracted from/to the spindle, and for controlling the first and second rotors to control the multimedia device angle further includes adjusting the retractable line extending from the spindle via the remote control such that as more of the retractable line is extended a wider rotation of the imaging assembly is generated.

In certain embodiments, the step of extending a retractable line therefrom the spindle at a proximal end thereof further includes passing the retractable line therethrough a side opening of the rotatable turntable.

In certain embodiments, the step of extending a first line and a second line from a distal end of the retractable line in opposite directions as the retractable line is extended from an exterior of the rotatable turntable further includes configuring the retractable line with at least one safety component at the distal end thereof such that the first and second lines are configured to detach therefrom at a connection point in the event at least one of the retractable line and the first and second lines become tangled during operation.

In certain embodiments, the step of providing an imaging assembly having a housing and an interior compartment further includes configuring the imaging assembly to be aerodynamic.

In certain embodiments, the multimedia device is a camera.

In certain embodiments, the overhead surface is at least one of a structural beam, ceiling, crane, drone, rope, slackline, staircase, tree limb, and wire cable.

In certain embodiments, the step of providing a remote control for controlling the rotatable turntable to control speed of rotation of the imaging assembly and for controlling the first and second rotors to control the multimedia device angle further includes aligning an orientation of the multimedia device in an imaging direction of the subject either inwardly toward inner circle or outwardly away from radius of the rotation path via the remote control.

In certain embodiments, the step of providing a remote control for controlling the rotatable turntable to control speed of rotation of the imaging assembly, and the length of the retractable line extended or retracted from/to the spindle, and for controlling the first and second rotors to control the multimedia device angle further includes configuring the remote control to control at least one operation parameter of the multimedia device.

In certain embodiments, the step of providing a remote control for controlling the rotatable turntable to control speed of rotation of the imaging assembly and for controlling the first and second rotors to control the multimedia device angle further includes configuring the remote control to trigger the multimedia device to capture orbiting images of the subject when in motion or static.

In a fourth aspect, there is provided herein a method for capturing an orbiting image of a subject. The method includes the following steps: mounting a rotatable turntable having first and second spindles formed therein to an overhead surface; extending first and second retractable lines therefrom the first and second spindles at a proximal end thereof; providing a multimedia device; providing an imaging assembly having a housing and an interior compartment, the housing having a first rotor at a first end thereof and a second rotor at a second end thereof; connecting the first retractable line to the first rotor and the second retractable line to the second rotor; receiving the multimedia device therein the interior compartment in which the multimedia device is attached thereto and is at least partially visible from an exterior of the housing; providing a remote control for controlling the rotatable turntable to control speed of rotation of the imaging assembly, and the length of each retractable line extended or retracted from/to each spindle, and for controlling the first and second rotors to control the multimedia device angle; and rotating the imaging assembly from above the subject along a rotation path to enable 360 degree orbiting image capture while the subject is in motion or static during operation.

Various advantages of this disclosure will become apparent to those skilled in the art from the following detailed description, when read in light of the accompanying drawings.

BRIEF DESCRIPTION OF THE DRAWINGS

FIG. 1 is a front perspective view of a system for capturing an orbiting image of a subject shown in operation in accordance with an example embodiment of the present disclosure.

FIG. 2 is an enlarged, top perspective view of a rotatable turntable used in the imaging system of FIG. 1 in accordance with an example embodiment of the present disclosure.

FIG. 3 is an enlarged, front elevation view of an imaging assembly containing a multimedia device shown suspended from first and second lines used in the system of FIG. 1 in accordance with an example embodiment of the present disclosure.

FIG. 4 is an enlarged, side elevation view of the imaging assembly of FIG. 3 in accordance with an example embodiment of the present disclosure.

DETAILED DESCRIPTION

Figure 5:
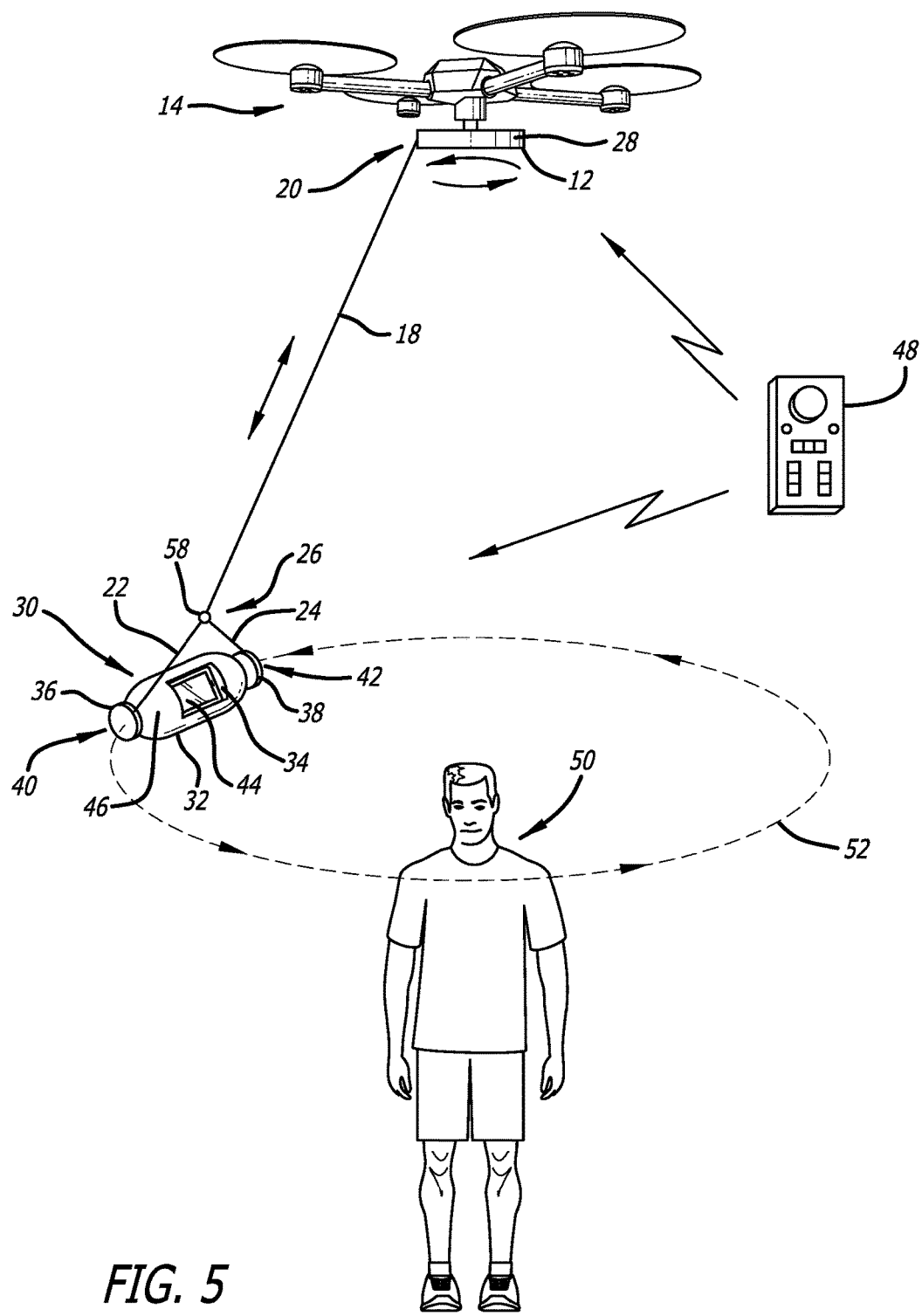
FIG. 5 is a front perspective view of the system for capturing an orbiting image of a subject shown in operation with the rotatable turntable mounted on a drone in accordance with an example embodiment of the present disclosure.
Figure 6:
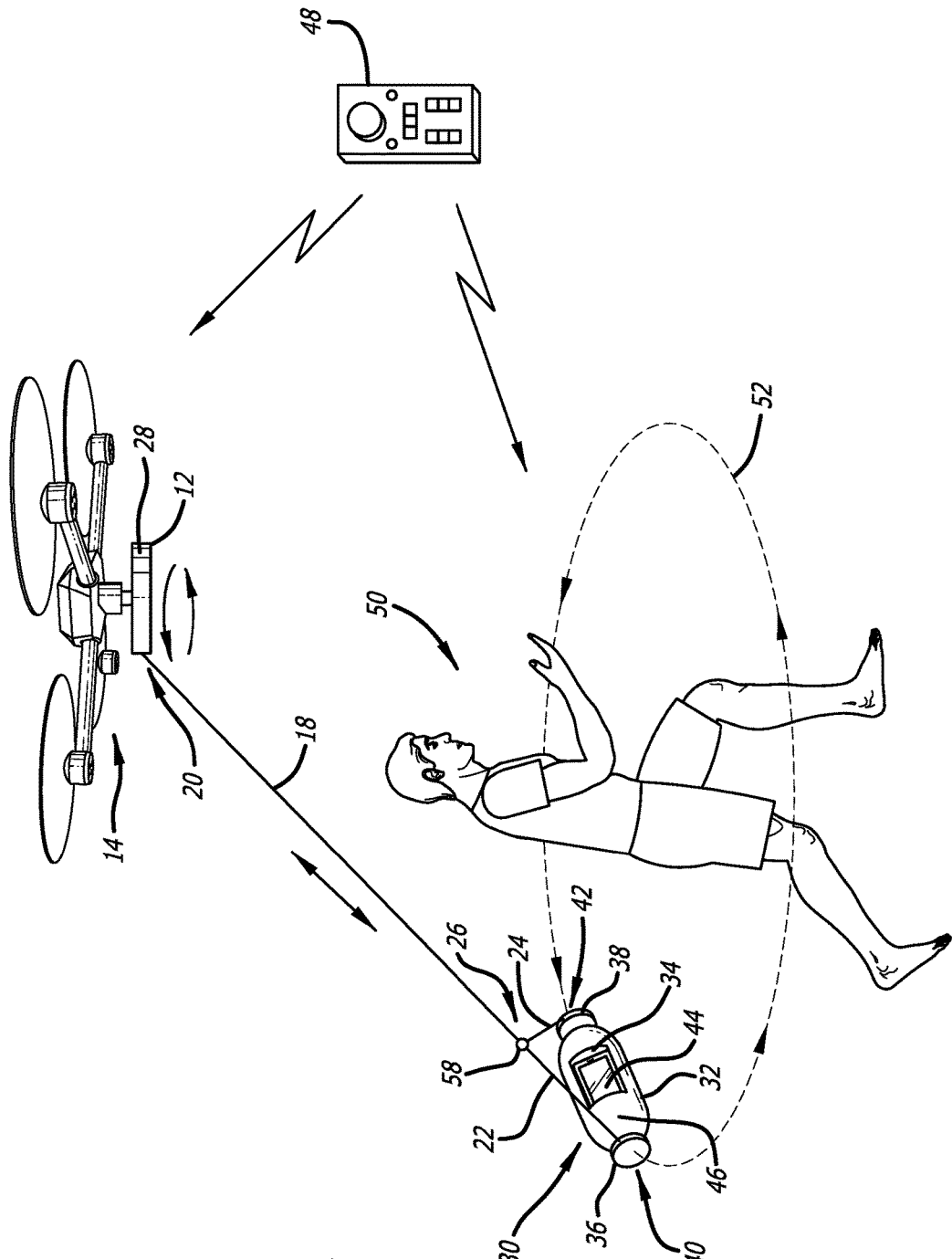
FIG. 6 is a front perspective view of the imaging system of FIG. 5 with the subject shown in motion during operation in accordance with an example embodiment of the present disclosure.

This disclosure is not limited to the particular apparatus, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All sizes recited in this document are by way of example only, and the disclosure is not limited to structures having the specific sizes or dimensions recited below. As used herein, the term "comprising" means "including, but not limited to."

The term "image", as used herein, may refer to a static or dynamic visual representation, including, but not limited to, a photo, a picture, a graphic, a video, a hologram, a virtual reality image, an augmented reality image, and other visual representations or combinations thereof.

In consideration of the figures, it is to be understood for purposes of clarity that certain details of construction and/or operation are not provided in view of such details being conventional and well within the skill of the art upon disclosure of the document described herein.

The present disclosure pertains to systems and methods for capturing an orbiting image of a subject while in motion or static in bullet time for filmmaking and other media purposes. The systems and methods allow for clean, unobstructed footage capture in which an imaging assembly (camera shuttle) is flown from above third person subject or object to enable 360 degree image capture along a rotation path while the subject is in motion or static during operation. Unlike conventional imaging systems, no platform or rotating arm is required. The imaging systems of the present disclosure are portable, mountable onto existing overhead structures (e.g., ceiling, structural beam, staircase, rope, tree limb, and wire cable, etc.) and temporary overhead objects (e.g., cranes, slack-lines and drones flown overhead), scalable in terms of camera rig used (consumer to professional), not stationary, and adjustable and controllable via remote control. Further, the imaging systems are not limited to 360 degree selfie footage only as such systems enable 360 degree orbiting image capture of the subject or time as the subject traverses space and time (i.e., can capture video of a jogger running down street).

In addition to the advantages described above, the versatility of the systems and methods of the present disclosure make it possible to: (1) film bullet time effects in live exterior locations (e.g., sporting events, entertainment industry red carpet events, concerts, and exterior film and television productions); (2) introduce a new competitive alternative at a lower cost for existing bullet time initiatives; (3) streamline post-production by eliminating expensive and time intensive processing; and (4) provide individual consumers a ground-breaking, innovative way to capture life time moments using existing consumer products (e.g., GoPros and/or iPhones).

Referring now to FIGS. 1-6, the imaging system 10 of the present disclosure will be described in more detail. The imaging system 10 generally includes a rotatable turntable 12 that is mountable to an overhead surface 14 with a spindle 16 formed therein and a retractable line 18 extending therefrom at a proximal end 20 thereof. First and second lines 22, 24 extend from a distal end 26 of the retractable line 18 in opposite directions as the retractable line 18 is extended from an exterior 28 of the rotatable turntable 12. The imaging system 10 further includes an imaging assembly 30 with a housing 32 and an interior compartment 34 in which the housing 32 includes first and second rotors 36, 38 at first and second ends 40, 42 thereof such that the first and second lines 22, 24 are connected to the first and second rotors 36, 38. First and second lines 22, 24 can be connected and secured at their distal ends to the first and second rotors 36, 38 via a custom metal saddle/bracket (not shown) attached to each rotor. The metal saddle/bracket (not shown) can be manually coupled or uncoupled to attach or detach first and second lines 22, 24 at will. The interior compartment 34 receives a multimedia device 44 that is attached thereto and is at least partially visible from an exterior 46 of the housing 32. A remote control 48 is configured to control the rotatable turntable 12 to in turn control speed of rotation of the imaging assembly 30, and the length of the retractable line 18 extended or retracted from/to the spindle 16, and further configured to control the first and second rotors 36, 38 to in turn control the multimedia device 44 angle. The imaging assembly 30 is rotated from above the subject 50 along a rotation path 52 to enable 360 degree orbiting image capture while the subject 50 is in motion or static during operation.

It is to be understood that the imaging assembly 30 travels in a generally circular rotation path 52 around the subject 50, preferably at least 360 degrees, however, any number of degrees is contemplated as being within the scope of the present disclosure. In addition, the imaging assembly 30 is preferably rotated from above the subject 50, however, the imaging assembly 30 can be rotated in a lower position along the retractable line 18 via the first and second lines 22, 24 so long as the multimedia device 44 is able to obtain image capture of the subject 50 during operation.

In accordance with the present disclosure, the rotatable turntable 12 is configured to generate rotation (indicated by arrows in FIGS. 1 and 5-6) of the imaging assembly 30 at variable speeds via the remote control 48. The retractable line 18 extending therefrom the spindle 16 is adjustable via the remote control 48 such that as more of the retractable line 18 is extended a wider rotation of the imaging assembly 30 is generated.

In the illustrated embodiments, the retractable line 18 is configured to pass through a side opening 54 of the rotatable turntable 12.

In some embodiments, the retractable line 18 can be configured with at least one safety component 56 at the distal end 26 thereof such that the first and second lines 22, 24 are configured to detach therefrom at a connection point 58 (e.g., a ring) in the event at least one of the retractable line 18 and the first and second lines 22, 24 become tangled and/or obstructed during operation. It is to be understood that the safety component feature is not limited to the configuration shown in the figures as any suitable safety component configuration with or without a ring portion may be used in accordance with the present disclosure.

It is to be understood that the overhead surface 14 to which the rotatable turntable 12 is mounted thereto can be any suitable existing overhead structure (e.g., structural beam, ceiling, staircase, rope, tree limb, wire cable, etc.), and any suitable temporary overhead objects (e.g., cranes, slack-lines, drones flown overhead, etc.).

In some embodiments, the imaging assembly 30 is configured to be aerodynamic and the multimedia device is a camera. It is to be understood that the multimedia device 44, 44' used in the systems and methods disclosed herein may be any type of image capturing device. For example, the multimedia device 44, 44' may be an action camera (e.g., GoPro), a digital camera, a web camera, a camera embedded in another device such as a smart phone (e.g., iPhone) (as shown in the figures), an iPad, a notebook, a tablet, a computer, a personal digital assistant (PDA), a monitoring device, a video gaming console, or any portable multimedia device that could record and/or capture video or still images.

In accordance with the present disclosure, the remote control 48 is configured to align an orientation of the multimedia device 44 in an imaging direction of the subject 50 either inwardly toward an inner circle or outwardly away from a radius of the rotation path 52. In some embodiments, the remote control 48 is further configured to control at least one operation parameter (e.g., on/off) of the multimedia device 44. The remote control 48 is further configured to trigger the multimedia device 44 to capture orbiting images of the subject 50 when in motion or static.

Figure 7:
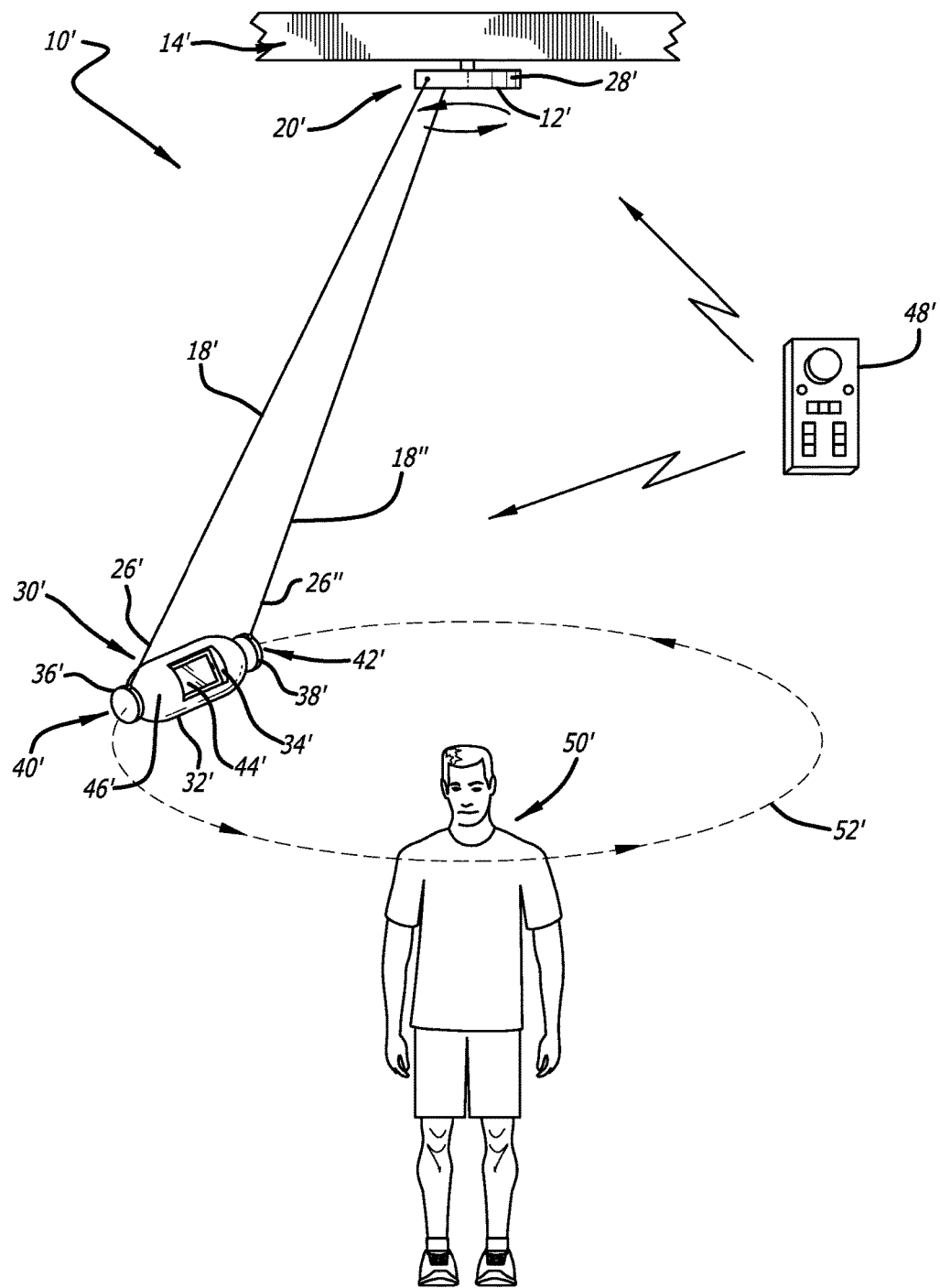
FIG. 7 is a front perspective view of an alternative embodiment of the system for capturing an orbiting image of a subject shown in operation in accordance with an example embodiment of the present disclosure.
Figure 8:
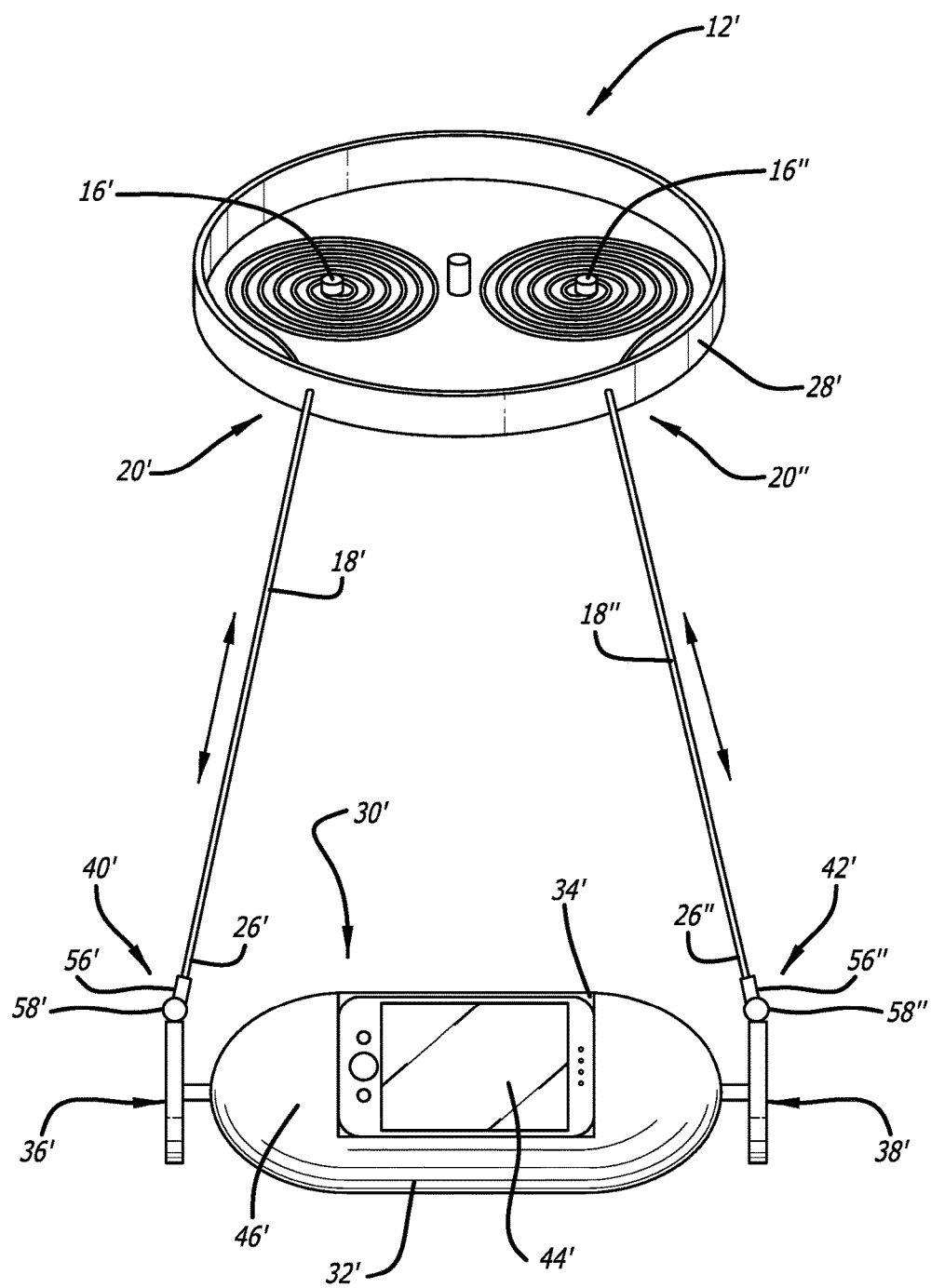
FIG. 8 is an enlarged, top perspective view of a rotatable turntable with dual spindles and corresponding retractable lines extending therefrom with an imaging assembly containing a multimedia device shown suspended from the retractable lines used in the imaging system of FIG. 7 in accordance with an example embodiment of the present disclosure.

Referring now to FIGS. 7-8, an alternative embodiment of the imaging system 10 of the present disclosure will be described in more detail. The system 10' includes a rotatable turntable 12' that is mountable to an overhead surface 14' with first and second spindles 16', 16" formed therein and first and second retractable lines 18', 18" extending therefrom at a proximal end 20' thereof. An imaging assembly 30' with a housing 32' and an interior compartment 34' in which the housing 32' includes first and second rotors 36', 38' at first and second ends 40', 42' thereof such that the first and second retractable lines 18', 18" are connected to the first and second rotors 36', 38'. First and second retractable lines 18', 18" can be connected to the first and second rotors 36', 38' via a custom metal saddle/bracket (not shown) attached to each rotor. The metal saddle/bracket (not shown) can be manually coupled or uncoupled to attach or detach first and second retractable lines 18', 18" at will, and/or a custom breakaway safety component 56', 56" can be attached to each rotor, such that first and second retractable lines 18', 18" detach in case of line entanglement and/or obstruction. The interior compartment 34' receives a multimedia device 44' that is attached thereto and is at least partially visible from an exterior 46' of the housing 32'. A remote control 48' is configured to control the rotatable turntable 12' to in turn control speed of rotation of the imaging assembly 30', and the length of each retractable line 18', 18" extended or retracted from/to each spindle 16', 16", and further configured to control the first and second rotors 36', 38' to in turn control the multimedia device 44' angle. The imaging assembly 30' is rotated from above the subject 50' along a rotation path 52' to enable 360 degree orbiting image capture while the subject 50' is in motion or static during operation.

It is to be understood that the imaging assembly 30' travels in a generally circular rotation path 52' around the subject 50', preferably at least 360 degrees, however, any number of degrees is contemplated as being within the scope of the present disclosure. In addition, the imaging assembly 30' is preferably rotated from above the subject 50', however, the imaging assembly 30' can be rotated in a lower position along the first and second retractable lines 18', 18" so long as the multimedia device 44' is able to obtain image capture of the subject 50' during operation.

In some embodiments, the first and second retractable lines 18', 18" can be configured with at least one safety component 56', 56" at the distal end 26', 26" thereof such that the imaging assembly 30' is configured to be released therefrom at a connection point 58', 58" (e.g., ring) in the event the first and second retractable lines 18', 18" become tangled and/or obstructed during operation. It is to be understood that the safety component feature is not limited to the configuration shown in the figures as any suitable safety component configuration with or without a ring portion may be used in accordance with the present disclosure.

In accordance with the present disclosure, the system 10' may include an auto leveling feature (not shown) to ensure that the imaging assembly remains level during flight. Specifically, first and second retractable lines 18', 18" are configured to extend or retract as necessary, so they are level with each other to ensure a level orbital image capture with the multimedia device 44'.

It is to be understood that the retractable lines 18, 18', 18" and first and second lines 22, 24 can be fabricated of dynamic nylon Kernmantle rope cords and/or other suitable durable materials of sufficient strength, allowing for minimal elasticity, such as woven fibers of Dacron into a strand of line and the like. It is presently contemplated that the retractable lines 18, 18', 18" and first and second lines 22, 24 can be fabricated in different lengths and sizes for use with the imaging systems and methods of the present disclosure.

It is to be further understood that the imaging assembly 30, 30' can be fabricated of plastic and/or other suitable sturdy materials, such as ABS plastic (acrylonitrile butadiene styrene), solid aircraft grade aluminum and the like. It is presently contemplated that the imaging assembly 30, 30' can be fabricated in different shapes and sizes so long as the imaging assembly 30, 30' is preferably aerodynamic while in flight during operation. The imaging assembly 30, 30' can be manufactured via 3D printing, injection molding, extrusion molding, vacuum molding or any suitable manufacturing process.

In accordance with the present disclosure, the first and second rotors 36, 36' and 38, 38' used with the imaging assembly 30, 30' described herein can include a motorized rotor and a control unit (not shown) for sending an electrical signal to drive the respective motors (not shown), a battery (not shown) for supplying power to each motor, a controller (not shown) for driving the respective motors. It is presently contemplated that a battery power source (not shown) for the first and second rotors 36, 36' and 38, 38' can reside on the imaging assembly 30, 30', rotatable turntable 12, 12' and/or spindles 16, 16', 16" and the battery (not shown) can reside in the rotatable turntable 12, 12' or in the imaging assembly 30, 30' or both.

The present disclosure further contemplates a method for capturing an orbiting image of a subject using the components of the imaging system 10 described herein. The method generally includes the following steps: mounting a rotatable turntable 12 having a spindle 16 formed therein to an overhead surface 14; extending a retractable line 18 therefrom the spindle 16 at a proximal end 20 thereof; extending a first line 22 and a second line 24 from a distal end 26 of the retractable line 18 in opposite directions as the retractable line 18 is extended from an exterior 28 of the rotatable turntable 12; providing a multimedia device 44; providing an imaging assembly 30 having a housing 32 and an interior compartment 34, the housing 32 having a first rotor 36 at a first end 40 thereof and a second rotor 38 at a second end 42 thereof; connecting the first line 22 to the first rotor 36 and the second line 24 to the second rotor 38; receiving the multimedia device 44 therein the interior compartment 34 in which the multimedia device 44 is attached thereto and is at least partially visible from an exterior 46 of the housing 32; providing a remote control 48 for controlling the rotatable turntable 12 to control speed of rotation of the imaging assembly 30, and the length of the retractable line 18 extended or retracted from/to the spindle 16, and for controlling the first and second rotors 36, 38 to control the multimedia device 44 angle; and rotating the imaging assembly 30 from above the subject 50 along a rotation path 52 to enable 360 degree orbiting image capture while the subject 50 is in motion or static during operation.

In some embodiments, the step of providing a remote control 48 for controlling the rotatable turntable 12 to control speed of rotation of the imaging assembly 30, and the length of the retractable line 18 extended or retracted from/to the spindle 16, and for controlling the first and second rotors 36, 38 to control the multimedia device 44 angle further includes configuring the rotatable turntable 12 to generate rotation of the imaging assembly 30 at variable speeds via the remote control 48.

In other embodiments, the step of providing a remote control 48 for controlling the rotatable turntable 12 to control speed of rotation of the imaging assembly 30, and the length of the retractable line 18 extended or retracted from/to the spindle 16, and and for controlling the first and second rotors 36, 38 to control the multimedia device 44 angle further includes adjusting the retractable line 18 extending from the spindle 16 via the remote control 48 such that as more of the retractable line 18 is extended a wider rotation of the imaging assembly 30 is generated.

In still other embodiments, the step of extending a retractable line 18 therefrom the spindle 16 at a proximal end 20 thereof further includes passing the retractable line 18 therethrough a side opening 54 of the rotatable turntable 12.

In further embodiments, the step of extending a first line 22 and a second line 24 from a distal end 26 of the retractable line 18 in opposite directions as the retractable line 18 is extended from an exterior 28 of the rotatable turntable 12 further includes configuring the retractable line 18 with at least one safety component 56 at the distal end 26 thereof such that the first and second lines 22, 24 are configured to detach therefrom at a connection point 58 in the event at least one of the retractable line 18 and the first and second lines 22, 24 become tangled during operation.

In some embodiments, the step of providing an imaging assembly 30 having a housing 32 and an interior compartment 34 further includes configuring the imaging assembly 30 to be aerodynamic.

In the illustrated embodiments, the multimedia device 44 is a camera.

In some embodiments, the overhead surface 14 is at least one of a structural beam, ceiling, crane, drone, rope, slackline, staircase, tree limb, and wire cable.

In other embodiments, the step of providing a remote control 48 for controlling the rotatable turntable 12 to control speed of rotation of the imaging assembly 30, and the length of the retractable line 18 extended or retracted from/to the spindle 16, and for controlling the first and second rotors 36, 38 to control the multimedia device 44 angle further includes aligning an orientation of the multimedia device 44 in an imaging direction of the subject 50 either inwardly toward inner circle or outwardly away from radius of the rotation path 52 via the remote control 48.

In some embodiments, the step of providing a remote control 48 for controlling the rotatable turntable 12 to control speed of rotation of the imaging assembly 30, and the length of the retractable line 18 extended or retracted from/to the spindle 16, and for controlling the first and second rotors 36, 38 to control the multimedia device 44 angle further includes configuring the remote control 48 to control at least one operation parameter (e.g., on/off) of the multimedia device 44.

In further embodiments, the step of providing a remote control 48 for controlling the rotatable turntable 12 to control speed of rotation of the imaging assembly 30, and the length of the retractable line 18 extended or retracted from/to the spindle 16, and for controlling the first and second rotors 36, 38 to control the multimedia device 44 angle further includes configuring the remote control 48 to trigger the multimedia device 44 to capture orbiting images of the subject 50 when in motion or static.

The present disclosure further contemplates a method for capturing an orbiting image of a subject using the components of the imaging system 10' described herein. The method generally includes the following steps: mounting a rotatable turntable 12' having first and second spindles 16', 16" formed therein to an overhead surface 14'; extending first and second retractable lines 18', 18" therefrom the first and second spindles 16', 16" at a proximal end 20', 22" thereof; providing a multimedia device 44'; providing an imaging assembly 30' having a housing 32' and an interior compartment 34', the housing 32' having a first rotor 36' at a first end 40' thereof and a second rotor 38' at a second end 42' thereof; connecting the first retractable line 18' to the first rotor 36' and the second retractable line 18" to the second rotor 38'; receiving the multimedia device 44' therein the interior compartment 34' in which the multimedia device 44' is attached thereto and is at least partially visible from an exterior 46' of the housing 32'; providing a remote control 48' for controlling the rotatable turntable 12' to control speed of rotation of the imaging assembly 30', and the length of each retractable line 18', 18" extended or retracted from/to each spindle 16', 16", and for controlling the first and second rotors 36', 38' to control the multimedia device 44' angle; and rotating the imaging assembly 30' from above the subject 50' along a rotation path 52' to enable 360 degree orbiting image capture while the subject 50' is in motion or static during operation.

It is to be understood that the imaging systems of the present disclosure are intended for both consumer and professional use. Consumer models of the imaging systems enable consumers to capture orbiting 360 degree images using consumer level cameras such as GoPro or iPhone and the like. Professional models of the imaging systems enable professional filmmakers to capture orbiting 360 degree images using much heavier professional camera rigs such as Arri Alexa coupled with professional cine lenses and the like.

These and other advantages of the present disclosure will be apparent to those skilled in the art. Accordingly, it will be recognized by those skilled in the art that changes or modifications may be made to the above-described embodiments without departing from the broad inventive concepts of the present disclosure. It should therefore be understood that the present disclosure is not limited to the particular embodiments described herein, but is intended to include all changes and modifications that are within the scope and spirit of the disclosure as encompassed by the disclosure and figures herein and the following claims.

What is claimed is:

1. A system for capturing an orbiting image of a subject, the system comprising:
   a rotatable turntable configured to be mountable to an overhead surface, the rotatable turntable having a spindle formed therein and a retractable line extending therefrom the spindle at a proximal end thereof;
   a first line and a second line each extending from a distal end of the retractable line in opposite directions as the retractable line is extended from an exterior of the rotatable turntable;
   a multimedia device;
   an imaging assembly having a housing and an interior compartment, the housing having a first rotor at a first end thereof and a second rotor at a second end thereof such that the first line is connected to the first rotor and the second line is connected to the second rotor, the interior compartment is configured to receive the multimedia device in which the multimedia device is attached thereto and is at least partially visible from an exterior of the housing; and a remote control configured to control the rotatable turntable to in turn control speed of rotation of the imaging assembly, and the length of the retractable line extended or retracted from/to the spindle, and further configured to control the first and second rotors to in turn control the multimedia device angle;

wherein the imaging assembly is configured to be rotated from above the subject along a rotation path to enable 360 degree orbiting image capture while the subject is in motion or static during operation.

2. The system of claim 1, wherein the rotatable turntable is configured to generate rotation of the imaging assembly at variable speeds via the remote control.

3. The system of claim 1, wherein the retractable line extending therefrom the spindle is adjustable via the remote control such that as more of the retractable line is extended a wider rotation of the imaging assembly is generated.

4. The system of claim 1, wherein the retractable line is configured to pass through a side opening of the rotatable turntable.

5. The system of claim 1, wherein the retractable line is configured with at least one safety component at the distal end thereof such that the first and second lines are configured to detach therefrom at a connection point in the event at least one of the retractable line and the first and second lines become tangled during operation.

6. The system of claim 1, wherein the imaging assembly is configured to be aerodynamic.

7. The system of claim 1, wherein the multimedia device is a camera.

8. The system of claim 1, wherein the overhead surface is at least one of a structural beam, ceiling, crane, drone, rope, slack-line, staircase, tree limb, and wire cable.

9. The system of claim 1, wherein the remote control is further configured to align an orientation of the multimedia device in an imaging direction of the subject either inwardly toward inner circle or outwardly away from radius of the rotation path.

10. The system of claim 1, wherein the remote control is further configured to control at least one operation parameter of the multimedia device.

11. The system of claim 1, wherein the remote control is further configured to trigger the multimedia device to capture orbiting images of the subject when in motion or static.

12. A system for capturing an orbiting image of a subject, the system comprising:

a rotatable turntable configured to be mountable to an overhead surface, the rotatable turntable having first and second spindles formed therein and first and second retractable lines extending therefrom the first and second spindles at a proximal end thereof;

a multimedia device;

an imaging assembly having a housing and an interior compartment, the housing having a first rotor at a first end thereof and a second rotor at a second end thereof such that the first retractable line is connected to the first rotor and the second retractable line is connected to the second rotor, the interior compartment is configured to receive the multimedia device in which the multimedia device is attached thereto and is at least partially visible from an exterior of the housing; and a remote control configured to control the rotatable turntable to in turn control speed of rotation of the imaging assembly, and the length of each retractable line extended or retracted from/to each spindle, and further configured to control the first and second rotors to in turn control the multimedia device angle;

wherein the imaging assembly is configured to be rotated from above the subject along a rotation path to enable 360 degree orbiting image capture while the subject is in motion or static during operation.

13. A method for capturing an orbiting image of a subject, the method comprising:

mounting a rotatable turntable having a spindle formed therein to an overhead surface;

extending a retractable line therefrom the spindle at a proximal end thereof;

extending a first line and a second line from a distal end of the retractable line in opposite directions as the retractable line is extended from an exterior of the rotatable turntable;

providing a multimedia device;

providing an imaging assembly having a housing and an interior compartment, the housing having a first rotor at a first end thereof and a second rotor at a second end thereof;

connecting the first line to the first rotor and the second line to the second rotor;

receiving the multimedia device therein the interior compartment in which the multimedia device is attached thereto and is at least partially visible from an exterior of the housing;

providing a remote control for controlling the rotatable turntable to control speed of rotation of the imaging assembly, and the length of the retractable line extended or retracted from/to the spindle, and for controlling the first and second rotors to control the multimedia device angle; and rotating the imaging assembly from above the subject along a rotation path to enable 360 degree orbiting image capture while the subject is in motion or static during operation.

14. The method of claim 13, wherein providing a remote control for controlling the rotatable turntable to control speed of rotation of the imaging assembly, and the length of the retractable line extended or retracted from/to the spindle, and for controlling the first and second rotors to control the multimedia device angle further comprises:

configuring the rotatable turntable to generate rotation of the imaging assembly at variable speeds via the remote control.

15. The method of claim 13, wherein providing a remote control for controlling the rotatable turntable to control speed of rotation of the imaging assembly, and the length of the retractable line extended or retracted from/to the spindle, and for controlling the first and second rotors to control the multimedia device angle further comprises:

adjusting the retractable line extending from the spindle via the remote control such that as more of the retractable line is extended a wider rotation of the imaging assembly is generated.

16. The method of claim 13, wherein extending a retractable line therefrom the spindle at a proximal end thereof further comprises:

passing the retractable line therethrough a side opening of the rotatable turntable.

17. The method of claim 13, wherein extending a first line and a second line from a distal end of the retractable line in opposite directions as the retractable line is extended from an exterior of the rotatable turntable further comprises:
  configuring the retractable line with at least one safety component at the distal end thereof such that the first and second lines are configured to detach therefrom at a connection point in the event at least one of the retractable line and the first and second lines become tangled during operation.

18. The method of claim 13, wherein providing an imaging assembly having a housing and an interior compartment, the housing having a first rotor at a first end thereof and a second rotor at a second end thereof further comprises:
  configuring the imaging assembly to be aerodynamic.

19. The method of claim 13, wherein the multimedia device is a camera.

20. The method of claim 13, wherein the overhead surface is at least one of a structural beam, ceiling, crane, drone, rope, slack-line, staircase, tree limb, and wire cable.

21. The method of claim 13, wherein providing a remote control for controlling the rotatable turntable to control speed of rotation of the imaging assembly, and the length of the retractable line extended or retracted from/to the spindle, and for controlling the first and second rotors to control the multimedia device angle further comprises:
  aligning an orientation of the multimedia device in an imaging direction of the subject either inwardly toward inner circle or outwardly away from radius of the rotation path via the remote control.

22. The method of claim 13, wherein providing a remote control for controlling the rotatable turntable to control speed of rotation of the imaging assembly, and the length of the retractable line extended or retracted from/to the spindle, and for controlling the first and second rotors to control the multimedia device angle further comprises:
  configuring the remote control to control at least one operation parameter of the multimedia device.

23. The method of claim 13, wherein providing a remote control for controlling the rotatable turntable to control speed of rotation of the imaging assembly, and the length of the retractable line extended or retracted from/to the spindle, and for controlling the first and second rotors to control the multimedia device angle further comprises:
  configuring the remote control to trigger the multimedia device to capture orbiting images of the subject when in motion or static.

24. A method for capturing an orbiting image of a subject, the method comprising:
  mounting a rotatable turntable having first and second spindles formed therein to an overhead surface;
  extending first and second retractable lines therefrom the first and second spindles at a proximal end thereof;
  providing a multimedia device;
  providing an imaging assembly having a housing and an interior compartment, the housing having a first rotor at a first end thereof and a second rotor at a second end thereof;
  connecting the first retractable line to the first rotor and the second retractable line to the second rotor;
  receiving the multimedia device therein the interior compartment in which the multimedia device is attached thereto and is at least partially visible from an exterior of the housing;
  providing a remote control for controlling the rotatable turntable to control speed of rotation of the imaging assembly, and the length of each retractable line extended or retracted from/to each spindle, and for controlling the first and second rotors to control the multimedia device angle; and
  rotating the imaging assembly from above the subject along a rotation path to enable 360 degree orbiting image capture while the subject is in motion or static during operation.

* * * * *